(12) United States Patent
Morenko et al.

(10) Patent No.: US 12,007,116 B2
(45) Date of Patent: Jun. 11, 2024

(54) DUAL PRESSURE FUEL NOZZLES

(71) Applicant: PRATT & WHITNEY CANADA CORP., Longueuil (CA)

(72) Inventors: Oleg Morenko, Oakville (CA); Sandeep Singh Dhalla, Woodbridge (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/179,829

(22) Filed: Feb. 19, 2021

(65) Prior Publication Data

US 2022/0268213 A1    Aug. 25, 2022

(51) Int. Cl.
| | |
|---|---|
| *F23R 3/28* | (2006.01) |
| *F23R 3/36* | (2006.01) |
| *F02C 9/40* | (2006.01) |
| *F23D 14/24* | (2006.01) |

(52) U.S. Cl.
CPC ............... *F23R 3/286* (2013.01); *F23R 3/36* (2013.01); *F02C 9/40* (2013.01); *F23D 14/24* (2013.01)

(58) Field of Classification Search
CPC .... F23R 3/286; F23R 3/36; F02C 9/40; F23D 14/24
See application file for complete search history.

(56) References Cited

U.S. PATENT DOCUMENTS

| | | | |
|---|---|---|---|
| 4,726,192 A | 2/1988 | Willis et al. | |
| 5,615,555 A | 4/1997 | Mina | |
| 8,146,365 B2 * | 4/2012 | Shum | F23R 3/10 60/740 |
| 8,186,166 B2 | 5/2012 | Varatharajan et al. | |
| 8,919,132 B2 | 12/2014 | Oskam | |
| 9,416,975 B2 | 8/2016 | Myers | |
| 10,794,596 B2 | 10/2020 | Dai et al. | |
| 2007/0003897 A1 * | 1/2007 | Koizumi | F23R 3/28 431/354 |
| 2010/0162711 A1 | 7/2010 | Zuo et al. | |
| 2015/0253010 A1 * | 9/2015 | Schlein | F23D 17/002 60/776 |
| 2016/0209037 A1 * | 7/2016 | Dai | F23R 3/36 |
| 2020/0355370 A1 * | 11/2020 | Jette | F02M 61/162 |

* cited by examiner

*Primary Examiner* — Gerald L Sung
*Assistant Examiner* — Alyson Joan Harrington
(74) *Attorney, Agent, or Firm* — NORTON ROSE FULBRIGHT CANADA LLP

(57) ABSTRACT

A fuel supply system for a gas turbine engine comprises a housing having a housing interior chamber and a fuel swirler disposed inside the housing interior chamber. The fuel swirler has an upstream end and downstream end relative to a fuel flow direction along a fuel nozzle longitudinal axis. The fuel swirler has a first axial fuel passage along the longitudinal axis in fluid communication with a first fuel supply and terminating at a first fuel outlet at the downstream end, a second axial fuel passage along the longitudinal axis in fluid communication with a second fuel supply and terminating at a second fuel outlet at the downstream end, and a plurality of compressed air outlets at the downstream end. The first fuel outlet is positioned on an outermost surface of the fuel swirler and leads directly to a mixing site downstream of the fuel swirler.

19 Claims, 8 Drawing Sheets

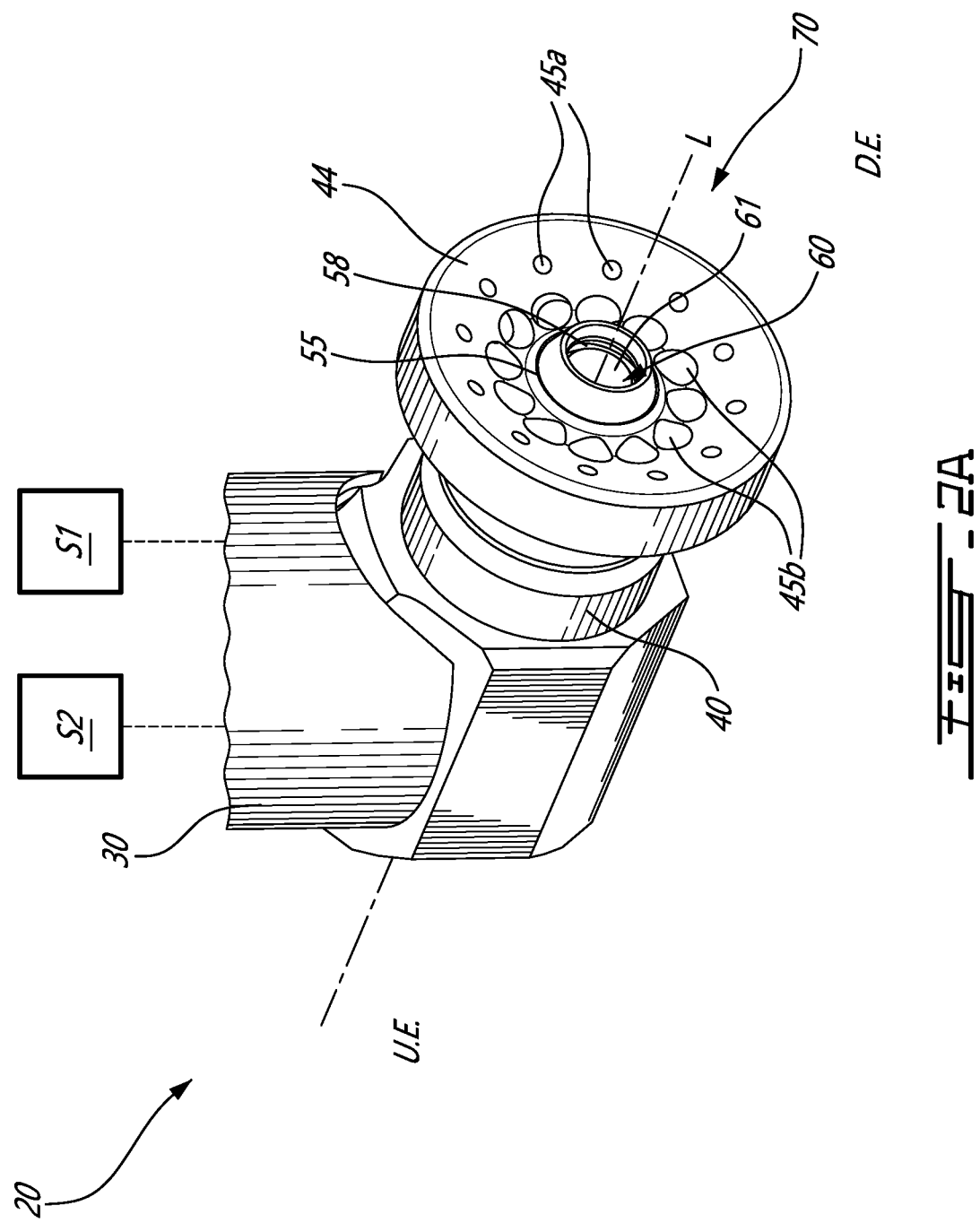

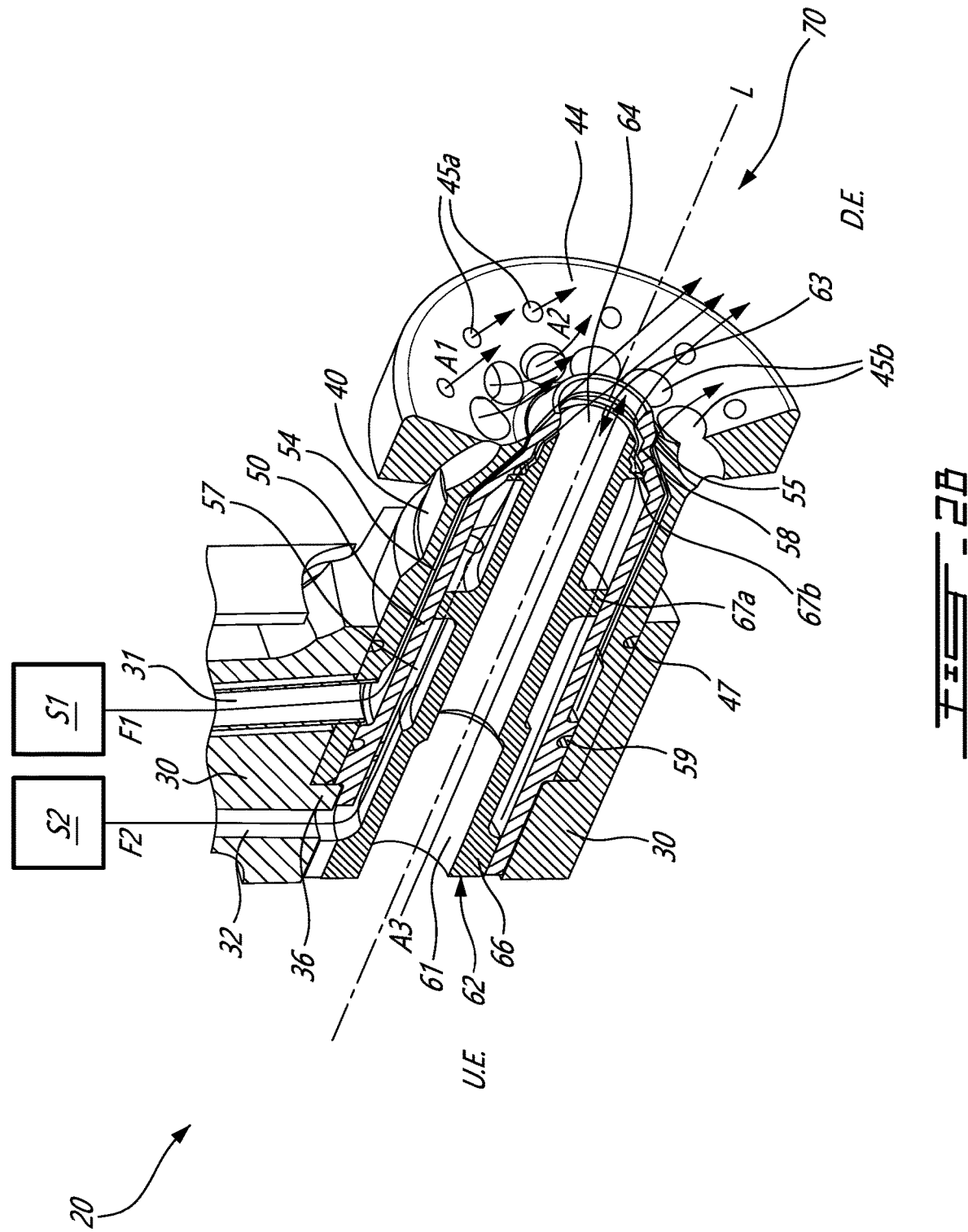

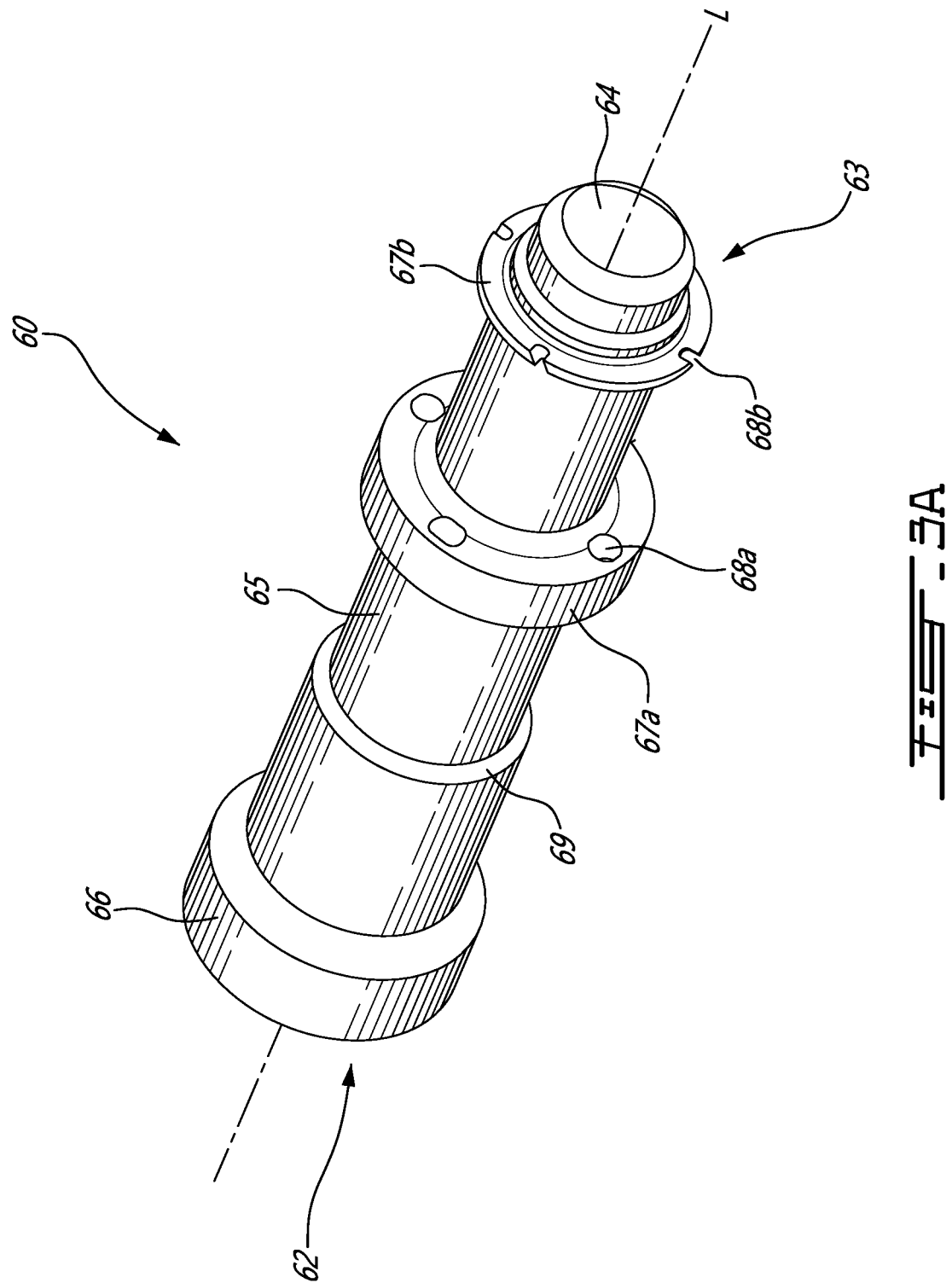

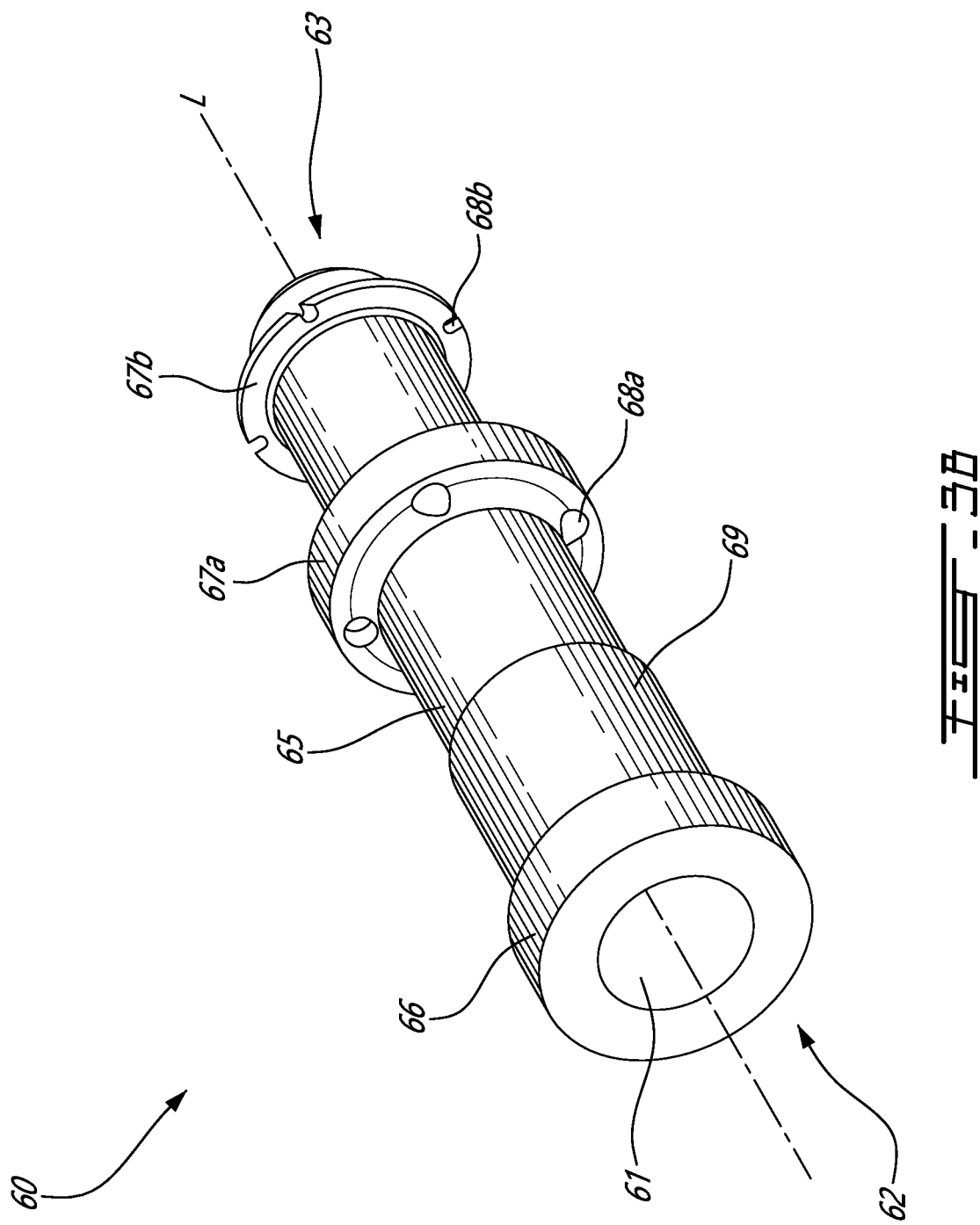

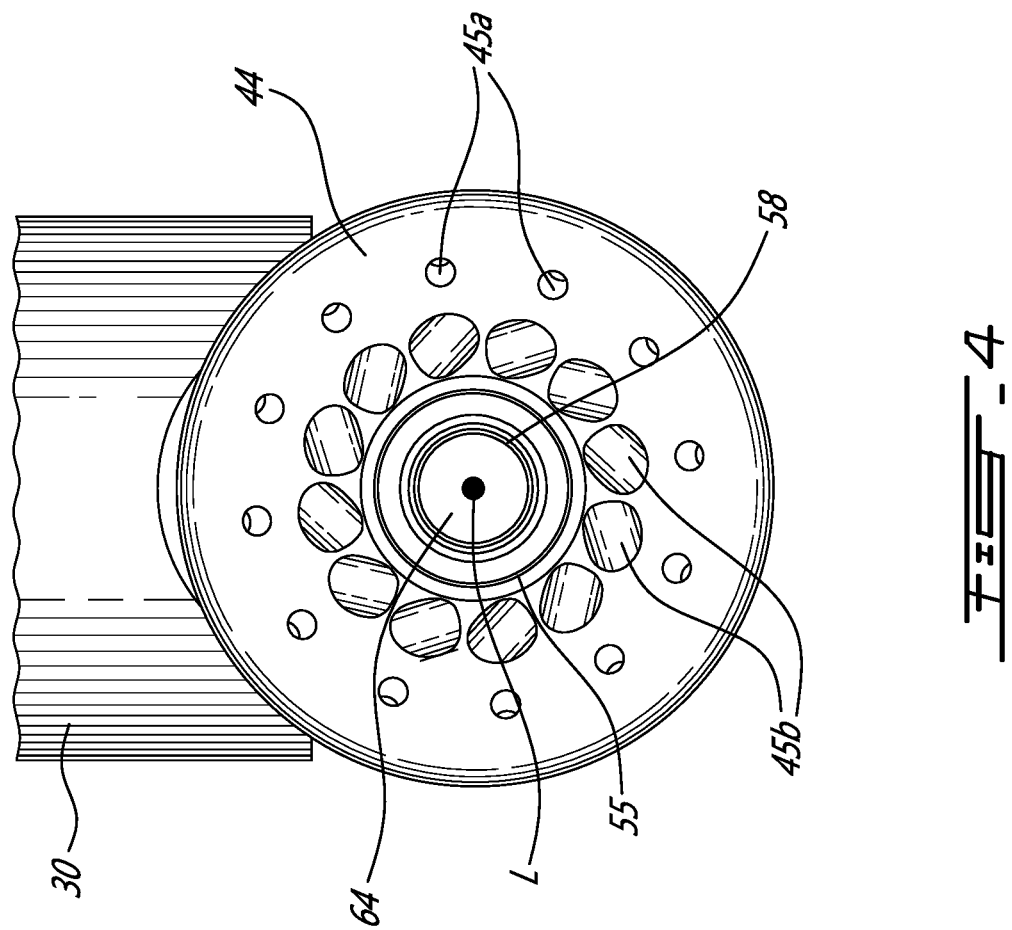

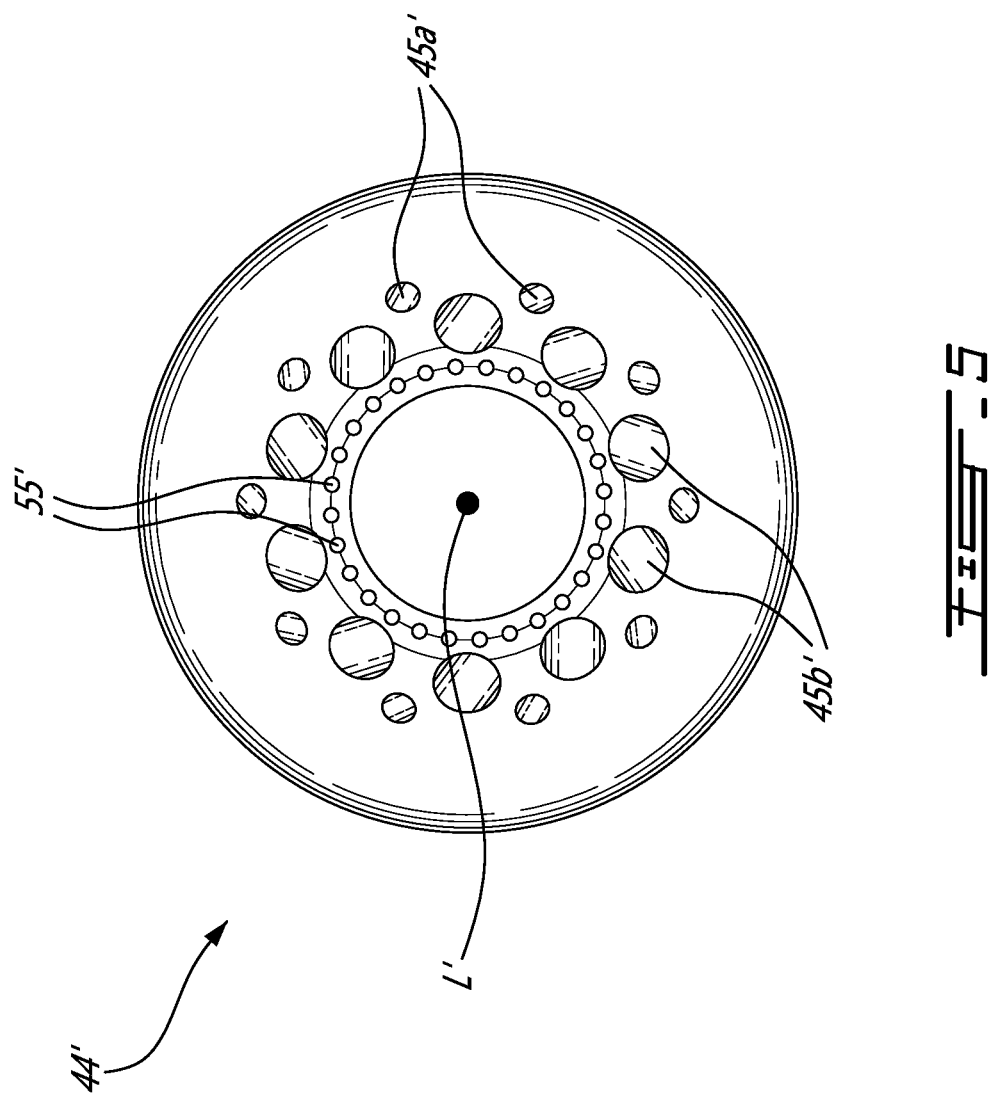

DUAL PRESSURE FUEL NOZZLES

TECHNICAL FIELD

The disclosure relates generally to gas turbine engines and, more particularly, to a dual pressure fuel nozzle suitable for directing two types of fuel into a combustor.

BACKGROUND

Fuel nozzles are used for injecting fuel and air mixtures into the combustors of gas turbine engines. Compressed fuel is typically fed under pressure into a central fuel swirler and a surrounding array of pressurized air flow channels is provided to form an atomized air/fuel mixture.

The fuel swirler may be assembled from a swirler housing with an interior chamber and a swirler core that is typically brazed or press fit into the interior chamber of the swirler housing. The combined configuration of control surfaces between the swirler housing and swirler core define fuel flow channels and shaped surfaces that control the direction, pressure and kinetic energy of the pressurized fuel flow to achieve a desired set of parameters for the fuel spray exiting the fuel outlet orifice.

Typical fuel nozzles are designed to inject a single type of fuel, for instance kerosene, and must be replaced if a different fuel type is to be used.

SUMMARY

In one aspect, there is provided a fuel supply system for a gas turbine engine, comprising: a fuel nozzle including a housing having a housing interior chamber; and a fuel swirler disposed inside the housing interior chamber, the fuel swirler having a fuel swirler upstream end and a fuel swirler downstream end relative to a fuel flow direction along a longitudinal axis of the fuel nozzle, a first axial fuel passage along the longitudinal axis in fluid communication with a first fuel supply and terminating at a first fuel outlet at the fuel swirler downstream end, a second axial fuel passage along the longitudinal axis in fluid communication with a second fuel supply and terminating at a second fuel outlet at the fuel swirler downstream end, and a plurality of compressed air outlets at the fuel swirler downstream end; wherein the first fuel outlet is positioned on an outer surface of the fuel swirler bordering a mixing site downstream of the fuel swirler, the first fuel outlet leading directly to the mixing site.

In another aspect, there is provided a fuel supply system for a gas turbine engine, comprising: a fuel nozzle having a first axial fuel passage radially formed between an inner fuel swirler and an outer fuel swirler relative to a central longitudinal axis, the first axial fuel passage in fluid communication with a hydrogen fuel supply in a housing and terminating at a first fuel outlet at a downstream end relative to a direction of fuel flow, the first fuel outlet positioned on an outermost surface of the fuel nozzle and delivering hydrogen fuel directly to a mixing site downstream of the fuel nozzle; a second axial fuel passage radially formed between a swirler core and the inner fuel swirler relative to the central longitudinal axis, the second axial fuel passage in fluid communication with a liquid fuel supply in the housing and terminating at a second fuel outlet at the downstream end; a first supply of compressed air through one or more end face compressed air outlets at an end face of the outer fuel swirler; and a second supply of compressed air through an internal bore of the swirler core terminating at a swirler core compressed air outlet at the downstream end.

In a further aspect, there is provided a method for assembling a fuel nozzle for a gas turbine engine, comprising: inserting an inner fuel swirler into a interior chamber of a housing; inserting an outer fuel swirler into the housing interior chamber and slipping the outer fuel swirler over the inner fuel swirler; aligning a first aperture in the outer fuel swirler with a first fuel supply in the housing; aligning a second aperture in the inner fuel swirler with a second fuel supply in the housing; and inserting a swirler core into an inner fuel swirler interior chamber.

BRIEF DESCRIPTION OF THE DRAWINGS

Reference is now made to the accompanying figures in which:

FIGS. 2A-2C are respective isometric, isometric cross-section and axial cross-section views of a fuel nozzle according to an embodiment of the present disclosure;

FIGS. 3A-3B are respective front and rear isometric views of a swirler core for the fuel nozzle of FIGS. 2A-2C;

FIG. 4 is a front view of the fuel nozzle of FIGS. 2A-2C; and

FIG. 5 is a front view of an outer fuel swirler for a fuel nozzle according to another embodiment of the present disclosure.

DETAILED DESCRIPTION

Figure 1:
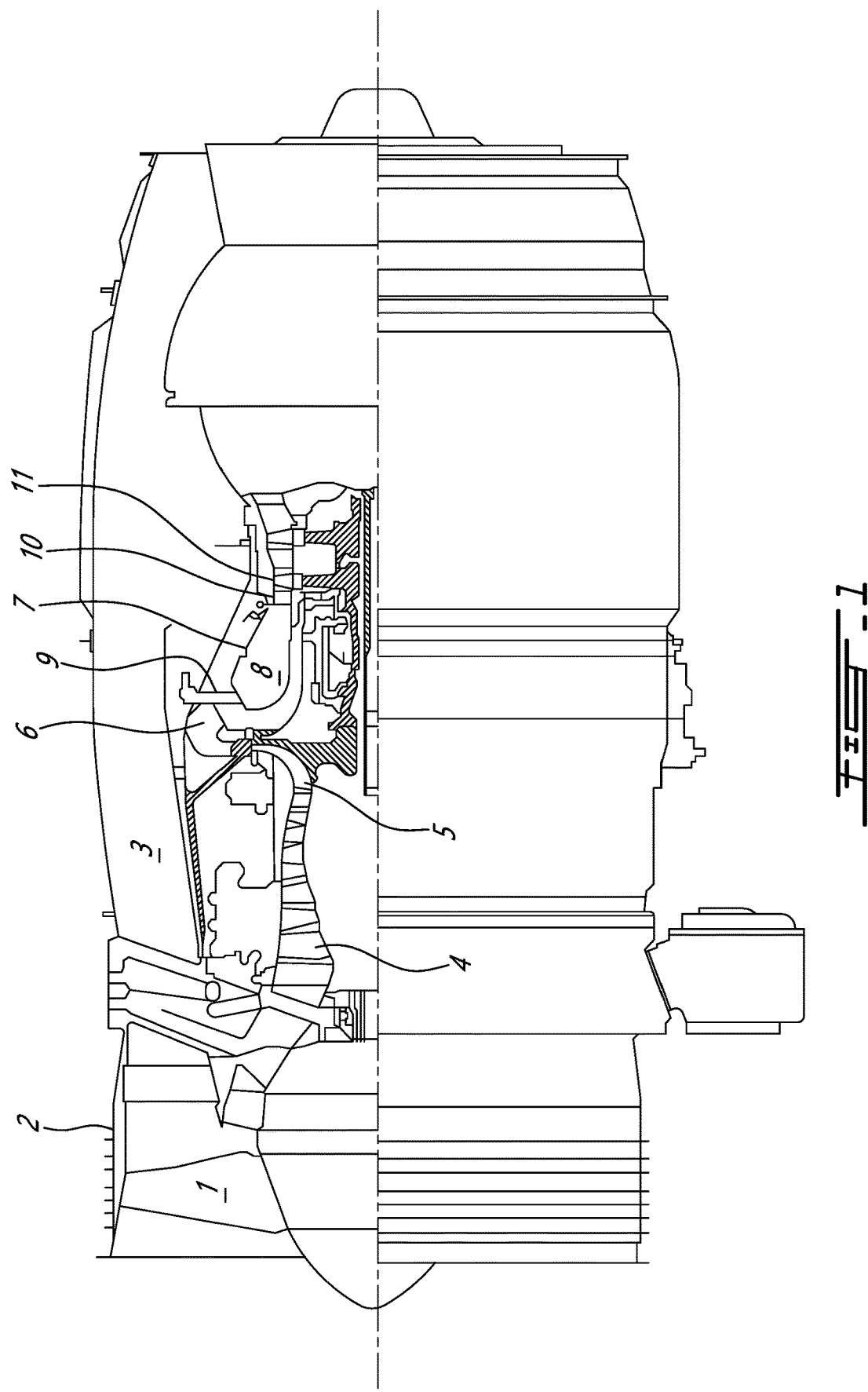
FIG. 1 is an axial cross-section view of a gas turbine engine.

FIG. 1 shows an axial cross-section through an example turbo-fan gas turbine engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust. Although FIG. 1 shows a turbofan-type engine, the present disclosure is also applicable to other types of gas turbine engines.

As will be discussed in further detail below, the present description is directed to a fuel supply system comprising fuel nozzles at the terminus of the fuel tubes 9 which direct an atomized fuel-air mixture into the combustor 8. A fuel nozzle may include one or more concentric arrays of compressed air orifices to create a swirling air flow surrounding a central fuel injecting swirler. The resultant shear forces between air and fuel cause the fuel and air mix to together and form an atomized fuel-air mixture for combustion. Although not visible in FIG. 1, the present disclosure is directed to fuel nozzles to be used in gas turbine engines having multiple fuel sources and thus multiple distinct fuel paths, passages or circuits. In various embodiments, two fuel sources or fuel manifolds may be utilized, one being a liquid fuel such as kerosene and the other being a gaseous fuel such as hydrogen. Other numbers and types of fuels may be contemplated as well. As will be discussed in further detail below, the fuel nozzles described herein may be operable to deliver the different types of fuel alternatingly and/or simultaneously, depending on the specific engine application.

Referring to FIGS. 2A-4 an exemplary embodiment of a fuel nozzle 20 for a gas turbine engine, for instance the engine of FIG. 1, is shown. The fuel nozzle 20 includes a housing 30 and a fuel swirler, illustratively including an outer fuel swirler 40, an inner fuel swirler 50 and a swirler core 60. Other arrangements for the fuel swirler may be contemplated as well, for instance a unitary fuel swirler with an interior chamber for mounting a swirler core. The fuel nozzle 20 is said to be a dual fuel nozzle as it is operable to deliver two different fuel types, either selectively or simultaneously, towards a mixing location or site 70 where the fuel(s) are to be mixed with compressed air before delivery to the combustor 8. In various cases, certain fuels such as hydrogen might auto-ignite or combust as soon as they mix with compressed air. As such, the mixing site 70 may also be referred to as a combustion site or a precursor to the combustor 8 in these cases. The term 'fuel swirler' may be employed herein to refer to the various components that swirl, mix or otherwise disturb the flow of fuel(s) as it passes through the fuel nozzle 20. The fuel nozzle 20 has a general upstream end U.E. and a general downstream end D.E. along a swirler core central longitudinal axis L relative to an overall direction of flow of fuel and compressed air through the fuel nozzle 20, as will be discussed in further detail below.

The housing 30 provides structural support for the fuel swirler. In the shown case, the housing 30 is a fuel stem 30. According to other embodiments, the fuel swirler could be directly mounted to an internal manifold ring, internal manifold segments or any other suitable fuel supply structures that may act as the housing 30. In the shown case, the stem 30 provides fuel to the fuel nozzle 20 through first and second fuel supplies 31, 32, illustratively longitudinal bores through the stem 30. In other cases, fuel may be supplied to the fuel nozzle 20 via other assemblies within the engine. A first fuel F1 is provided from a first fuel source S1 and a second fuel F2 is provided from a second fuel source S2. In the shown case, the first fuel supply 31 is operable to transport a gaseous fuel from the first fuel source S1 that may be susceptible to auto-ignite upon mixing with oxygen, such as hydrogen, to the fuel swirler, while the second fuel supply 32 is operable to transport a liquid jet fuel from the second fuel source S2 to the fuel swirler, although other fuel type arrangements may be contemplated as well.

In the shown case, the gaseous fuel is hydrogen and the liquid jet fuel is kerosene. Various kerosene-based fuels may be contemplated, such as jet A, Jet A-1, JP-S and JP-8. Other fuel types may be contemplated as well. For instance, in an industrial application, the fuel nozzle 20 may be operable to receive natural gas, diesel and/or biofuels via the first and second fuel supplies 31, 32.

The distal end of the stem 30 defines an interior chamber 33 having an upstream opening 34 and a downstream opening 35 spaced apart along axis that is in a direction normal to the longitudinal axis of the stem 30. The stem interior chamber 33 is operable to house the various fuel swirler components, as will be discussed in further detail below, and may include one or more stops or protrusions 36 for aligning and retaining the various inserted components.

As discussed above, in the shown embodiment, although not necessarily the case in all embodiments, the fuel swirler includes an outer fuel swirler 40, an inner fuel swirler 50, and a swirler core 60. The shown outer fuel swirler 40 is disposed inside the interior chamber 33 and is illustratively axially held in place by stops 36. The shown outer fuel swirler 40 has an outer fuel swirler interior chamber 41 with an outer fuel swirler upstream end 42 and a frustoconically-shaped outer fuel swirler downstream end 43. Other shapes for the outer fuel swirler 40 may be contemplated as well. The shown outer fuel swirler 40 protrudes outwardly from the interior chamber 33 in a direction towards the downstream end D.E. and includes an end face 44 at the outer fuel swirler downstream end 43. In the shown case, the end face 44 is annular, although other forms for the end face 44 may be contemplated as well. As shown, the annular end face 44 incudes a plurality of circumferentially-arranged end face compressed air outlets, illustratively two concentric circumferentially extending rows of end face compressed air outlets, i.e. an outer row of end face compressed air outlets 45a for delivering a first stream of compressed air A1 and an inner row of end face compressed air outlets 45b for delivering a second stream of compressed air A2. Various sources for the compressed air within the engine may be contemplated. In other cases, the annular end face 44 may have other arrangements of compressed air outlets, such as a single row of compressed air outlets or one or more annular ring-type compressed air outlets.

The compressed air may be sourced from various compressed air sources within the engine. In the shown case, the outer end face compressed air outlets 45a are smaller and spaced further apart than the inner end face compressed air outlets 45b, although other arrangements may be contemplated as well. In addition, each of the shown outer end face compressed air outlets 45a and inner end face compressed air outlets 45b are angled to deliver the compressed air to the mixing site 70 at various locations and angles, for instance to promote mixing. Various numbers, sizes, angles and positions for the end face compressed air outlets 45a, 45b may be contemplated, for instance based on the fuel types (s), their combustion requirements and/or the required gas pressure. In the shown case, as best seen in FIG. 4, the outer end face compressed air outlets 45a are directed inwardly towards the longitudinal axis L in the mixing site 70, while the inner end face compressed air outlets 45b are directed both inwardly towards the longitudinal axis L and circumferentially in a directions towards an adjacent inner end face compressed air inlet 45b.

In the shown embodiment, the inner fuel swirler 50 is disposed inside the outer fuel swirler 40. Illustratively, the inner fuel swirler 50 also engages with the stops 36 of the stem 30 for axial positioning and retaining purposes. The inner fuel swirler 50 includes an inner fuel swirler interior chamber 51 for receiving the swirler core 60, as will be discussed in further detail below. The shown inner fuel swirler interior chamber 51 includes an inner fuel swirler upstream end 52 and a frustoconically-shaped inner fuel swirler downstream end 53.

When assembled, the inner fuel swirler 50 sits concentrically within the outer fuel swirler 40 and defines a first axial fuel passage 54 between the outer fuel swirler 40 and the inner fuel swirler 50. As such, the shown first axial fuel passage 54 is said to be annular. The first axial fuel passage 54 is in fluid communication with the first fuel supply 31 via a first aperture 46 in the outer fuel swirler 40 and extends towards the downstream end D.E. until a first fuel outlet 55. The shown inner fuel swirler 50 also includes a second aperture 56 for directing the second fuel F2, as will be discussed in further detail below.

In the shown case, the first fuel outlet 55 is operable to deliver the first fuel F1, for instance a gaseous fuel such as hydrogen, to the mixing site 70. The first fuel outlet 55 is positioned on an outermost surface of the fuel swirler relative to the longitudinal axis L, as will be discussed in further detail below. The illustrated first fuel outlet 55 is an annular fuel outlet disposed about the longitudinal axis L and is circumferentially inward of the inner end face compressed air outlets 45*b*, although other arrangements may be contemplated as well. The thickness of the first axial fuel passage 54 and the sizing of the first fuel outlet 55 may vary, for instance based on the type of fuel flow delivered via the first fuel supply 31, its properties (for instance viscosity) and its effects on mixing and combustion. The fuel delivery angle of the first fuel outlet 55 may vary as well.

In the shown case, the first fuel outlet 55 is positioned on an outermost surface of the fuel swirler towards the downstream end D.E. relative to the longitudinal axis L, i.e. on the annular end face 44. This outermost surface of the fuel swirler borders the mixing zone 70, i.e. it is acts as a boundary between the fuel swirler and the mixing zone 70. As such, the first fuel outlet 55 leads directly into the mixing site 70 so that it delivers the first fuel F1 directly to the mixing site 70 where it mixes with compressed air, i.e. there is no pre-mixing zone for the first fuel F1. For gaseous F1 fuels such as hydrogen that auto-ignite upon mixing with the compressed air, any pre-mixing with air within the fuel nozzle 20 may result in early ignition that may damage the fuel nozzle 20 or other components. As such, by injecting the F1 fuel directly into the mixing site 70 via the first fuel outlet 55, the durability of the fuel nozzle 20 may be improved.

The swirler core 60 has an internal bore 61 extending longitudinally through the swirler core 60 along the longitudinal axis L through which compressed air is transported, as will be discussed in further detail below. According to the illustrated embodiment, the internal bore 61 is a central bore coaxial to the centerline of the swirler core 60. As best shown in FIG. 3A, the swirler core 60 includes a swirler core upstream end 62 and a swirler core downstream end 63 relative to a general direction of fuel and air flow through the fuel nozzle 20. As will be discussed in further detail below, compressed air stream A3 from a compressed air source (not shown) flows through the internal bore 61 and exits the swirler core 60 at a swirler core compressed air outlet 64 at the swirler core downstream end 63 towards the mixing site 70. In the shown case, the swirler core compressed air outlet 64 is circular. In various cases, the sizing and shape of the swirler core compressed air outlet 64 as well as the sizing and shape of the internal bore 61 may vary, for instance based on the required quantity of compressed air for mixture with the fuel and combustion. In the shown case, compressed air is thus delivered to the mixing site 70 via outer end face compressed air outlets 45*a* and inner end face compressed air outlets 45*b*, as well as via the swirler core compressed air outlet 64, for optimal fuel and air mixture. The quantity and direction of air delivery may vary, for instance based on the fuel type(s) and the desired combustion characteristics.

The swirler core 60 further includes a shank portion 65 forming the exterior profile of the swirler core 60 and extending from the swirler core upstream end 62 to the swirler core downstream end 63. In the shown case, the shank portion 65 incudes an annular shoulder portion 66 and a pair of axially spaced-apart annular protrusions 67*a*, 67*b* with respective circumferentially disposed fuel-directing apertures 68*a*, 68*b*. As shown in FIGS. 3A-3B, the fuel-directing apertures 68*a*, 68*b* may be disposed through the annular protrusions 67*a*, 67*b* at an angle relative to the central longitudinal axis L for directing and mixing a flow of fuel, as will be discussed in further detail below. Various angles may be contemplated, for instance based on the type of fuel selected and its viscosity. In the shown case, the fuel-directing apertures referenced by 68*a* are in the form of holes while the fuel-directing apertures referenced by 68*b* are in the form of cutouts, although other forms and combinations may be contemplated as well. In other cases, the swirler core 60 may include other numbers of annular protrusions with circumferentially disposed fuel-directing apertures. An additional shoulder 69 may further aid in directing a flow of fuel and/or accelerate the flow of compressed air A passing through the internal bore 61.

Figure 2C:
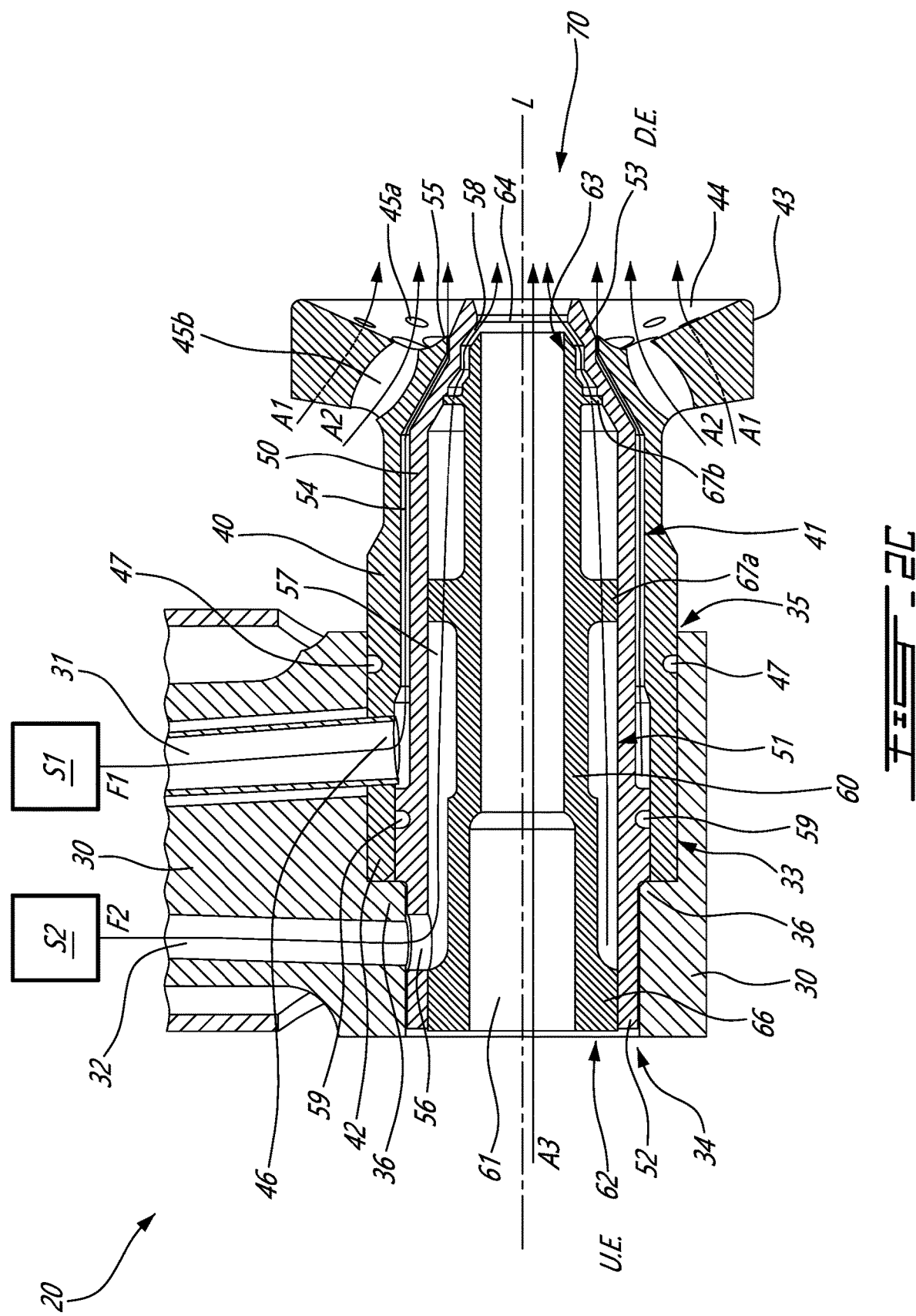

As best shown in FIG. 2C, a second axial fuel passage 57 is radially formed between the swirler core 60 and the inner swirler 50, and thus in the shown case is said to be annular. The second axial fuel passage 57 is in fluid communication with the second fuel supply 32 via the second aperture 56 and extends towards the downstream end D.E. until a second fuel outlet 58. In the shown case, the annular protrusions 67*a*, 67*b* radially extend between the swirler core 60 and the inner fuel swirler 50, only allowing fuel to pass through the fuel-directing apertures 68*a*, 68*b*. As the second fuel F2 flows through the second axial fuel passage 57, it passes through fuel-directing apertures 68*a*, 68*b* in annular protrusions 67*a*, 67*b*. The angles of these fuel-directing apertures 68*a*, 68*b*, cause the second fuel F2 to mix and swirl as it flows towards the second fuel outlet 58. Other mixing and swirling features within the second axial fuel passage 57 may be contemplated as well. may be contemplated as well.

In the shown case, the second fuel outlet 58 is operable to deliver the second fuel F2, for instance a liquid fuel such as kerosene, to the mixing site 70. The illustrated second fuel outlet 58 is an annular fuel outlet disposed about the longitudinal axis L and is circumferentially inward of the first fuel outlet 55 and circumferentially outward of the swirler core compressed air outlet 64, although other arrangements may be contemplated as well. The thickness of the second axial fuel passage 57 and the sizing of the second fuel outlet 58 may vary, for instance based on the type of fuel flow delivered via the second fuel supply 32, its properties (for instance viscosity) and its effects on mixing and combustion. The fuel delivery angle of the second fuel outlet 58 may vary as well. In the shown case, although the second fuel outlet 58 is annular in nature, the exiting fuel will not exit uniformly due to the mixing and swirling caused by the fuel-directing apertures 68*a*, 68*b*, as discussed above. Due to the proximity of the first and second fuel outlets 55, 58, fuels from two independent circuits may be atomized at close radial locations to each other relative to the longitudinal axis L, reducing the impact that a fuel change may have on downstream hot section components in terms of thermal profiles. In addition, the delivery of different compressed air streams A1, A2, A3 from various directions may aid in atomizing the fuel.

In an exemplary embodiment, the fuel nozzle 20 may be assembled via the following process in a clearance fit-type fashion. First, the inner fuel swirler 50 is inserted into the stem interior chamber 33 via the downstream opening 35 until it hits a stop 36, ensuring the second aperture 56 is aligned with an outlet of the second fuel supply 32. Then, the outer fuel swirler 40 is slipped over the inner fuel swirler as it is inserted into the interior chamber 33 via the downstream opening 35 until it hits a stop 36, ensuring that the first aperture 46 is aligned with an outlet of the first fuel supply 31. Then, the swirler core 60 is inserted into the inner fuel swirler interior chamber 51 via the inner fuel swirler upstream end 52 until the annular protrusion 67b abuts the frustoconical inner fuel swirler downstream end 53 and/or the shoulder portion 66 engages the interior wall of the inner fuel swirler 50. The above-describes steps may be carried out in different orders. In other cases, various steps may be added or omitted. Other assembly processes may be contemplated as well.

In the shown case, the fuel nozzle 20 includes a plurality of brazing joints 47, 59, illustratively in the outer fuel swirler 40 and inner fuel swirler 50, which are used to secure the various components of the fuel nozzle 20 together upon assembly. A brazing joint may be added to the shoulder portion 66 as well (not shown), which may also aid in sealing. In an exemplary process, a brazing compound may be applied to the various brazing joints upon assembly. Then, the fuel nozzle 20 may be inserted into an oven to harden the brazing compound and secure and seal the various components together. Additionally or alternatively, welding may be employed to secure and seal various components together. In other cases, some or all of the various components may engage in a press fit-type connection for secure engagement. Other securing techniques may be contemplated as well.

In another embodiment, as discussed above, the fuel swirler 20 may be a unitary fuel swirler rather than a two-part fuel swirler having an outer fuel swirler 40 and an inner fuel swirler 50. In such a case, the unitary fuel swirler may include an interior chamber for mounting the swirler core 60 with an upstream end and a frustoconically-shaped downstream end with an end face such as an annular end face at the downstream end. The first axial fuel passage 54 may be integrated within the unitary fuel swirler while the second axial fuel passage 57 may be formed between the swirler core 60 and the unitary fuel swirler. Other fuel swirler arrangements may be contemplated as well.

Various manufacturing processes may be utilized to produce the fuel nozzle 20. Traditional manufacturing and removal techniques using machines such as lathes and mills may be implemented. Other manufacturing techniques such as additive manufacturing, metal injection moulding and casting may be contemplated as well. As discussed above, various brazing or welding procedures may be utilized to fix the various components of the fuel nozzle 20 together. A given fuel nozzle 20 may be manufactured based on the specific fuel types to be utilized. For instance, the shown fuel nozzle 20 is operable to receive hydrogen through the first axial fuel passage 54 and kerosene through the second axial fuel passage 57. The first and second fuel outlets 55, 58 may be dimensioned to optimize the delivery of these fuels to the mixing site 70 based on the unique properties of each fuel and the desired combustion performance indicators. For instance, the cross-sectional area of the first fuel outlet 55 may be optimized based on the desired hydrogen pressure, while the cross-sectional area of the second fuel outlet 58 may be optimized based on the viscosity of the kerosene. Similarly, the number, size and area of the various end face compressed air outlets 45a, 45b, 64 may be optimized to achieve a desired fuel-to-air ratio for ignition and operation. Other parameter optimizations may be contemplated as well.

Various operating modes for the fuel nozzle 20 may be contemplated. As discussed above, the shown fuel nozzle 20 is operable to deliver two different fuels to the combustor 8, either alternatingly or simultaneously. One or both of the fuel circuits are said to be powered during operation, indicating that they are providing a given fuel to the mixing site 70 and then to the combustor 8. For instance, an aircraft employing the fuel nozzle 20 may utilize a first fuel, for instance hydrogen, for a first flight and then utilize a second fuel, for instance kerosene, for a second flight immediately after the first flight. No modifications to the fuel nozzle 20 would be required to switch from the first fuel source S1 to the second fuel source S2 as the fuel nozzle's 20 various fuel and compressed air outlets are already optimized for both fuel types. As such, the aircraft operators would simply have to select a different fuel supply before departing on the second flight rather than having to switch to a different fuel nozzle for the second fuel F2. Similarly, in other embodiments, the fuel type delivered to the combustor may be switched mid-flight without requiring any modifications to the fuel nozzle 20.

In other cases, a hybrid combustor (not shown) may be employed that is operable to receive and combust two types of fuel, for instance hydrogen and kerosene, simultaneously. In such cases, the fuel nozzle 20 would be operable to deliver both fuel types through their respective fuel passages 54, 57 to the mixing site 70 and then to the combustor 8. Various combinations of fuel mixtures without having to remove and replace the fuel nozzle 20 may be contemplated.

In cases where the second fuel F2, for instance a liquid fuel such as kerosene, flows through the second axial fuel passage 57 while no fuel flows through the first axial fuel passage 54 (i.e. the first fuel supply 31 is inactive while the second fuel supply 32 is powered), the first axial fuel passage 54 may act as an air gap insulating layer for the second fuel F2. As such, the first axial fuel passage 54 may shield the second fuel F2 flowing through the second axial fuel passage 57 from various heat sources in the engine such as convection and radiation effects from combustion. Similarly, in cases where the first fuel F1, for instance a gaseous fuel such as hydrogen, flows through the first axial fuel passage 54 while no fuel flows through the second axial fuel passage 57 (i.e. the second fuel supply 32 is inactive while the first fuel supply 31 is powered), the second axial fuel passage 57 may act as an air gap insulating layer for the first fuel F1. As such, the second axial fuel passage 57 may shield the fuel flowing through the first axial fuel passage 54 from the hot compressed air A3 flowing through the internal bore 61 of the swirler core 60. Other insulating means may be contemplated as well. Such insulation techniques may reduce the temperature of the fuel flowing through the various fuel passages, which may improve the durability of the fuel nozzle 20.

In another embodiment, an exemplary fuel nozzle (not shown) may include three fuel passages. For instance, two fuel passages may be dedicated to a first fuel type, for instance a liquid fuel, in a duplex nozzle-type arrangement whereby a first fuel path is optimized for engine startup while the second fuel path is optimized for steady-state operation and acceleration. The third fuel path may then be dedicated to a second fuel type, for instance a gaseous fuel such as hydrogen. As such, this fuel nozzle with three fuel paths may be operable to deliver two fuel types either simultaneously or sequentially. In other cases, fuel nozzles with three or more fuel paths carrying three or more fuel types may be contemplated as well.

Referring to FIG. 5, an additional embodiment of an outer fuel swirler 40' is shown. In this case, the first fuel outlets 55' are individual holes rather than a single annular fuel outlet as shown above. The first fuel outlets 55' are circumferentially disposed about the longitudinal axis L' on the annular end face 44' of the outer fuel swirler 40'. In other cases, the first fuel outlets 55' may be disposed on the inner fuel swirler downstream end (not shown) or formed by a combination of the annular end face 44' and the inner fuel swirler downstream end. While the illustrated first fuel outlets 55' are shown to be circular, other shapes such as squares or slots may be contemplated as well. The number, shape and size of the first fuel outlets 55' may vary, for instance based on the type of fuel(s) provided and the required mixing and combustion characteristics. In this case, the outer end face compressed air outlets 45a' are directed inwardly towards the longitudinal axis L' in the mixing site, while the inner end face compressed air outlets 45b' are directed both inwardly towards the longitudinal axis L' and circumferentially in a directions towards an adjacent inner end face compressed air inlet 45b'.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A fuel supply system for a gas turbine engine, comprising:
    a fuel nozzle including:
        a housing having a housing interior chamber; and
        a fuel swirler disposed inside the housing interior chamber, the fuel swirler having a fuel swirler upstream end and a fuel swirler downstream end relative to a fuel flow direction along a longitudinal axis of the fuel nozzle, a first axial fuel passage along the longitudinal axis in fluid communication with a first fuel supply and terminating at a first fuel outlet at the fuel swirler downstream end, a second axial fuel passage along the longitudinal axis in fluid communication with a second fuel supply and terminating at a second fuel outlet at the fuel swirler downstream end, and a plurality of compressed air outlets at the fuel swirler downstream end, the fuel swirler further including an end face at the fuel swirler downstream end, the end face disposed at a furthest downstream axial position of the fuel swirler relative to the longitudinal axis; the fuel swirler further having a swirler core;
        wherein the first fuel outlet is positioned on the end face, the end face bordering a mixing site downstream of and outside of the fuel swirler, the first fuel outlet leading directly to the mixing site;
        wherein the first axial fuel passage and the second axial fuel passage are formed on opposite sides of a same annular wall of the fuel swirler, a first radial surface of the same annular wall partially defining the first axial fuel passage and a second radial surface of the same annular wall partially defining the second axial fuel passage; and
    wherein the plurality of compressed air outlets include a plurality of end face compressed air outlets extending through the end face and circumferentially disposed relative to the longitudinal axis about the end face and a swirler core compressed air outlet at the fuel swirler downstream end.

2. The fuel supply system as defined in claim 1, wherein the fuel swirler includes:
    an outer fuel swirler disposed inside the housing interior chamber, the outer fuel swirler having an outer fuel swirler interior chamber with an outer fuel swirler upstream end and a frustoconically-shaped outer fuel swirler downstream end, the frustoconically-shaped outer fuel swirler downstream end having the end face; and
    an inner fuel swirler disposed inside the outer fuel swirler interior chamber, the inner fuel swirler having an inner fuel swirler interior chamber with an inner fuel swirler upstream end and a frustoconically-shaped inner fuel swirler downstream end;
    wherein the swirler core is disposed inside the inner fuel swirler interior chamber, the swirler core having an internal bore extending between a swirler core upstream end and a swirler core downstream end.

3. The fuel supply system as defined in claim 2, wherein the first axial fuel passage is radially formed relative to the longitudinal axis between the outer fuel swirler and the inner fuel swirler, and the second axial fuel passage is radially formed relative to the longitudinal axis between the swirler core and the inner fuel swirler.

4. The fuel supply system as defined in claim 1, wherein the plurality of end face compressed air outlets include an outer row of circumferentially-arranged end face compressed air outlets and an inner row of circumferentially-arranged end face compressed air outlets, the inner row of circumferentially-arranged end face compressed air outlets disposed radially inward of the outer row of circumferentially-arranged end face compressed air outlets relative to the longitudinal axis.

5. The fuel supply system as defined in claim 1, wherein the housing is a fuel stem for the gas turbine engine.

6. The fuel supply system as defined in claim 3, wherein the swirler core includes a shank portion extending from the swirler core upstream end to the swirler core downstream end, the shank portion having one or more annular protrusions protruding radially outward relative to the longitudinal axis into the second axial fuel passage and having a plurality of fuel-directing apertures.

7. The fuel supply system as defined in claim 6, wherein the plurality of fuel-directing apertures are angled relative to the longitudinal axis.

8. The fuel supply system as defined in claim 2, wherein the swirler core includes a shoulder portion at the swirler core upstream end, the shoulder portion engageable with an interior wall of the inner fuel swirler interior chamber.

9. The fuel supply system as defined in claim 1, wherein the first fuel supply is a gaseous fuel supply and the second fuel supply is a liquid fuel supply.

10. The fuel supply system as defined in claim 1, wherein the first axial fuel passage is disposed radially outward of the second axial fuel passage relative to the longitudinal axis.

11. The fuel supply system as defined in claim 1, wherein the first fuel outlet includes a plurality of circumferentially-arranged outlet holes disposed about the longitudinal axis.

12. A fuel supply system for a gas turbine engine, comprising:
    a fuel nozzle having:
        a fuel swirler disposed inside a housing interior chamber, the fuel swirler having a fuel swirler upstream end and a fuel swirler downstream end relative to a fuel flow direction along a central longitudinal axis of the fuel nozzle, the fuel swirler including an end face at the fuel swirler downstream end, the end face disposed at a furthest downstream axial position of the fuel swirler relative to the central longitudinal axis;
        a first axial fuel passage radially formed between an inner fuel swirler and an outer fuel swirler relative to the central longitudinal axis, the first axial fuel passage in fluid communication with a hydrogen fuel supply in a housing having the housing interior chamber and terminating at a first fuel outlet at the fuel swirler downstream end, the first fuel outlet positioned on the end face, the end face bordering a mixing site downstream of and outside of the fuel swirler relative to the central longitudinal axis, and delivering hydrogen fuel directly to the mixing site;

a second axial fuel passage radially formed between a swirler core and the inner fuel swirler relative to the central longitudinal axis, the second axial fuel passage in fluid communication with a liquid fuel supply in the housing and terminating at a second fuel outlet at the fuel swirler downstream end;

wherein the first axial fuel passage and the second axial fuel passage are formed on opposite sides of an annular wall forming the inner fuel swirler, a first radial surface of the annular wall partially defining the first axial fuel passage and a second radial surface of the annular wall partially defining the second axial fuel passage;

a first supply of compressed air through a plurality of end face compressed air outlets extending through the end face and circumferentially disposed relative to the central longitudinal axis about the end face; and a second supply of compressed air through an internal bore of the swirler core terminating at a swirler core compressed air outlet at the fuel swirler downstream end.

13. The fuel supply system as defined in claim 12, wherein the plurality of end face compressed air outlets include an outer row of circumferentially-arranged end face compressed air outlets and an inner row of circumferentially-arranged end face compressed air outlets, the inner row of circumferentially-arranged end face compressed air outlets disposed radially inward of the outer row of circumferentially-arranged end face compressed air outlets relative to the central longitudinal axis.

14. The fuel supply system as defined in claim 12, wherein the outer row of circumferentially-arranged end face compressed air outlets are angled to direct compressed air circumferentially.

15. The fuel supply system as defined in claim 12, wherein the second axial fuel passage includes a plurality of fuel-directing apertures through one or more annular protrusions extending radially outward relative to the central longitudinal axis from a swirler core shank portion of the swirler core.

16. The fuel supply system as defined in claim 12, wherein the housing is a fuel stem for the gas turbine engine.

17. The fuel supply system as defined in claim 12, wherein the liquid fuel supply is a liquid kerosene fuel supply.

18. The fuel supply system as defined in claim 12, wherein the first axial fuel passage is disposed radially outward of the second axial fuel passage relative to the central longitudinal axis.

19. The fuel supply system as defined in claim 12, wherein the first axial fuel passage is operable to thermally insulate the second axial fuel passage as the liquid fuel supply is powered and the hydrogen fuel supply is inactive.

* * * * *